United States Patent [19]
Frank et al.

[11] Patent Number: 5,081,475
[45] Date of Patent: Jan. 14, 1992

[54] VERTICAL LINE WIDTH CONTROL IONOGRAPHIC SYSTEM

[75] Inventors: John A. Frank; Brendan C. Casey; Robert P. Robideau, all of Webster, N.Y.

[73] Assignee: Xerox Corporation, Stamford, Conn.

[21] Appl. No.: 560,535

[22] Filed: Jul. 30, 1990

[51] Int. Cl.$^5$ ............................................. G01D 15/06
[52] U.S. Cl. ................................. 346/159; 346/160.1
[58] Field of Search ............................. 346/159, 160.1

[56] References Cited

U.S. PATENT DOCUMENTS

| | | | |
|---|---|---|---|
| 4,463,363 | 7/1984 | Gundlich et al. | 346/159 |
| 4,558,334 | 12/1985 | Fotland | 346/159 |
| 4,628,211 | 12/1986 | Ruppert . | |
| 4,751,659 | 6/1988 | Hecht | 346/154 X |
| 4,794,412 | 12/1988 | Casey et al. | 346/154 |

FOREIGN PATENT DOCUMENTS 0014581 1/1985 Japan .

Primary Examiner—George H. Miller, Jr.
Attorney, Agent, or Firm—Duane C. Basch

[57] ABSTRACT

A device for the adjustment of the digital data stream that drives the modulators in an ionographic printing device. In particular, the device stretches strings of black image pixels to produce wider vertical lines and other fine details that may have been adversely affected due to modulator crosstalk. Moreover, the present invention is implemented in such a manner, so as to enable the end user to selectively define the magnitude of stretching to be applied to the strings of black pixels.

7 Claims, 7 Drawing Sheets

VERTICAL LINE WIDTH CONTROL IONOGRAPHIC SYSTEM

BACKGROUND OF THE INVENTION

1. Field of the Invention

The present invention relates to ionographic systems for creating images and, in particular, to the method and apparatus to control the vertical line width in images created with such ionographic systems.

2. Description of the Prior Art

The problem of crosstalk between adjacent electrodes in an ionographic print head is known. For example, U.S. Pat. No. 4,558,334 discloses a two electrode ion generator producing ions only during the print period requiring reduced power to achieve given ion outputs, and includes low impedance gated oscillators to reduce capacitive crosstalk between the electrodes.

In some ionographic systems, the problem of crosstalk manifests itself in the difficulty of producing vertical lines in printed images. In such systems there is generally an array of adjacent modulating electrodes, each of the electrodes being driven by a gate receiving a strobe voltage and a data voltage to reproduce a black or white spot corresponding to a digital image signal. For example, the crosstalk phenomenon is evidenced in vertical lines on the reproduced images, lines parallel to the processing direction, that tend to start light and get darker and wider as they continue in the vertical direction until reaching a stable thickness and density. Also, the stable thickness is often too thin to the point that 1 bit wide vertical lines (lines of 1 bit or pixel length) are virtually nonexistent, and the widths of 2 bit wide vertical lines are approximately equal to the width of a 1 bit wide horizontal line. U.S. Pat. No. 4,794,412 to Casey et al. teaches of just such a phenomenon and indicates a way to reduce the crosstalk effects. Adjustment of the strobe and data voltages applied to the ionographic array gates which drive the ion modulators reduced the amount of crosstalk between modulators. Specifically, by lowering the data voltage below the strobe voltage level, the crosstalk between modulators was reduced.

Unfortunately, system latitudes prevent the reduction of the data and strobe voltages to a point which would assure the ability to eliminate crosstalk field effects and the associated problem of printing fine vertical structures. Therefore, an additional method was needed to compensate for the crosstalk effects which would enhance the printed output and make the system less prone to the introduction of crosstalk errors.

It is an object of the present invention, therefore, to provide a new and improved method and apparatus to compensate for crosstalk in an ionographic printing device and in particular, to provide uniform and consistent output of vertical structure within images created by an ionographic printing device. It is another object of the present invention to enable the selective variation of the printed width for all vertical structure in printed output created with the ionographic device.

Further advantages of the present invention will become apparent as the following description proceeds, and the features characterizing the invention will be pointed out with particularity in the claims annexed to and forming a part of this specification.

SUMMARY OF THE INVENTION

Briefly, the present invention is a hardware device for the adjustment of the digital data stream that drives each of the modulators in an ionographic printing device, in particular the stretching of strings of similar pixels to widen or enhance the output of fine detail present in the digital input image. Moreover, the present invention is implemented in such a manner, so as to enable the user to select the magnitude of the enhancement to be applied to each string of similar pixels.

BRIEF DESCRIPTION OF THE DRAWINGS

For a better understanding of the present invention reference may be had to the accompanying drawings wherein the same reference numerals have been applied to like parts and wherein.

DESCRIPTION OF THE PREFERRED EMBODIMENT

Figure 1:
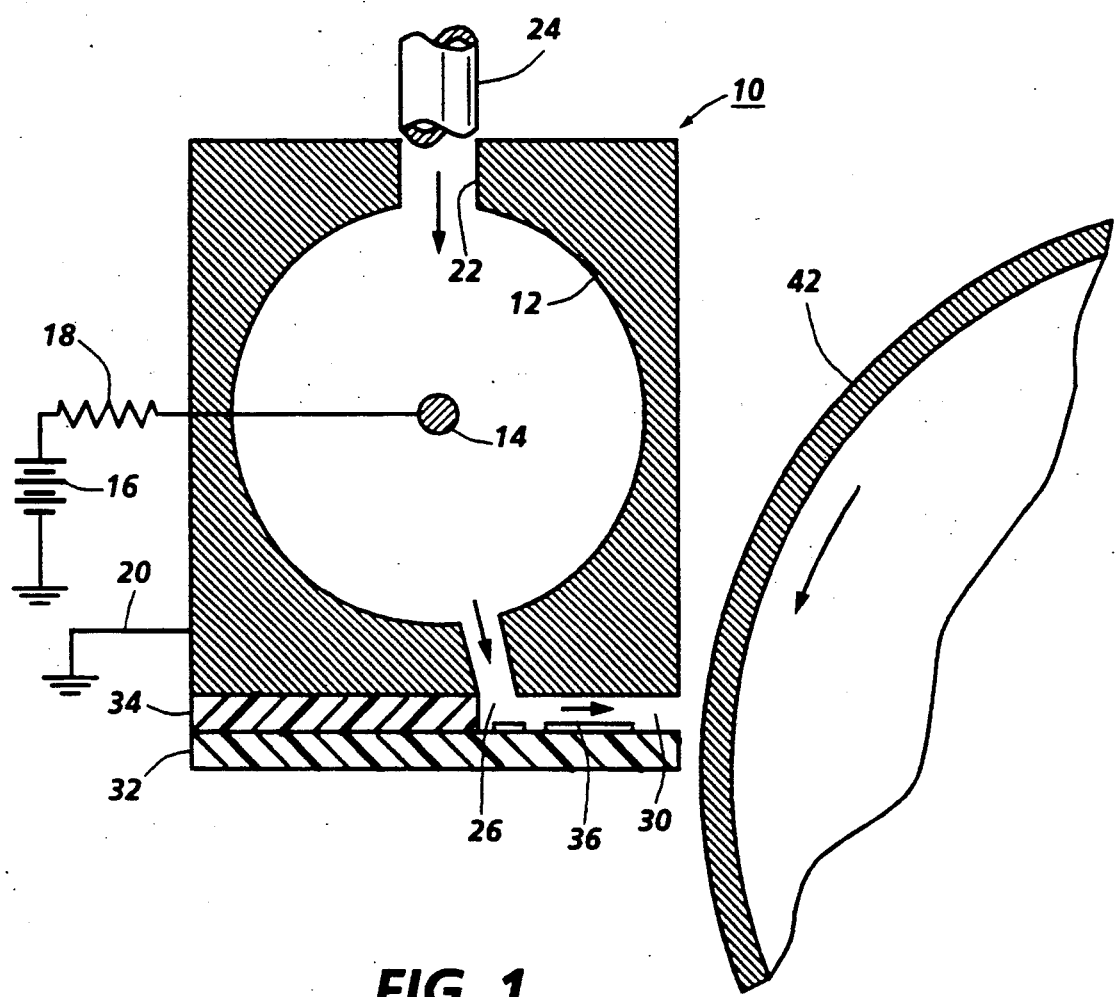
FIG. 1 is a schematic of a print head for use with the present invention.

With particular reference to the drawings, there is illustrated in FIG. 1 a housing 10 which includes an electrically conductive, elongated chamber 12 and a corona discharge wire 14, extending along the length of the chamber. A high potential source 16, on the order of several thousand volts dc, is connected to the wire 14 through a suitable load resistor 18, and a reference potential source 20 (which may be ground) is connected to the wall of chamber 12. Upon application of the high potential to corona discharge wire 14, a corona discharge surrounds the wire, creating a source of ions of a given polarity (preferably positive), which are attracted to the grounded chamber wall and fill the chamber with a space charge.

An inlet channel 22 extends along the chamber substantially parallel to wire 14 to deliver pressurized transport fluid (preferably air) into the chamber 12 from a suitable source, schematically illustrated by the tube 24. An outlet channel 26, from the chamber 12, also extends substantially parallel to wire 14, at a location opposed to inlet channel 22, for conducting the ion laden transport fluid to the exterior of the housing 10. The outlet channel 26 comprises two portions, a first portion directed substantially radially outwardly from the chamber and a second portion 30 angularly disposed to the first portion. The second portion 30 is formed by the unsupported extension of a marking head 32 spaced from and secured to the housing by insulating shim 34. As the ion laden transport fluid passes through the outlet 26, it flows over an array of ion pixel of modulation electrodes 36, each extending in the direction of the fluid flow, and integrally formed on the marking head 32.

Ions are allowed to pass completely through and out of ion projection apparatus 10, through outlet channel 26 towards an insulating charge receiver 42 which collects the ions upon its surface in an image configuration. Once the ions have been swept into outlet channel 26 by the transport fluid, it becomes necessary to render the ion-laden fluid stream intelligible. This is accomplished by selectively controlling the potential on the modulation electrodes by any suitable means.

As described in U.S. Pat. No. 4,463,363, incorporated herein by reference, once the ions in the transport fluid stream come under the influence of the modulation electrode, they may be viewed as individual "beams", which may be allowed to pass to the receiver 42 or to be suppressed within the outlet channel. "Writing" of a single spot or pixel in a raster line is accomplished when the modulation electrode is selectively connected to a potential source at substantially the same potential as that on the opposing wall of the outlet channel. With both walls of the channel being at about the same electrical potential, there will be substantially no electrical field extending thereacross. Thus, ions passing therethrough will be unaffected and will exit the housing to be deposited upon the charge receptor.

Conversely, when a suitable potential is applied to the modulation electrode, a field will extend across the outlet channel to the opposite, electrically grounded, wall. If the electrical potential imposed on the modulation electrode is of the same sign as the ions, the ion "beam" will be repelled from the modulation electrode to the opposite wall where the ions may recombine into uncharged, or neutral, air molecules. If the electrical potential imposed on the modulation electrode is of the opposite sign as the ions, the ion "beam" will be attracted to the modulation electrode where they may recombine into uncharged or neutral, air molecules. Therefore, that "beam" of transport fluid, exiting from the housing in the vicinity of that modulation electrode, will carry substantially no "writing" ions.

An imagewise pattern of information will be formed by selectively controlling each of the modulation electrodes in the array so that the ion beams associated therewith either exit or are inhibited from exiting the housing in accordance with the pattern and intensity of light and dark spots of the image to be reproduced. It should be understood that the image to be reproduced is generally a digital image and that each light and dark spot is generally represented by a string of one or more similar binary values. Specifically, in the description of the present embodiment, a string of 0's, indicating inactive pixels, would be representative of a white area and a string of 1's, indicating active pixels, would be representative of a dark area on the output image.

Figure 2:
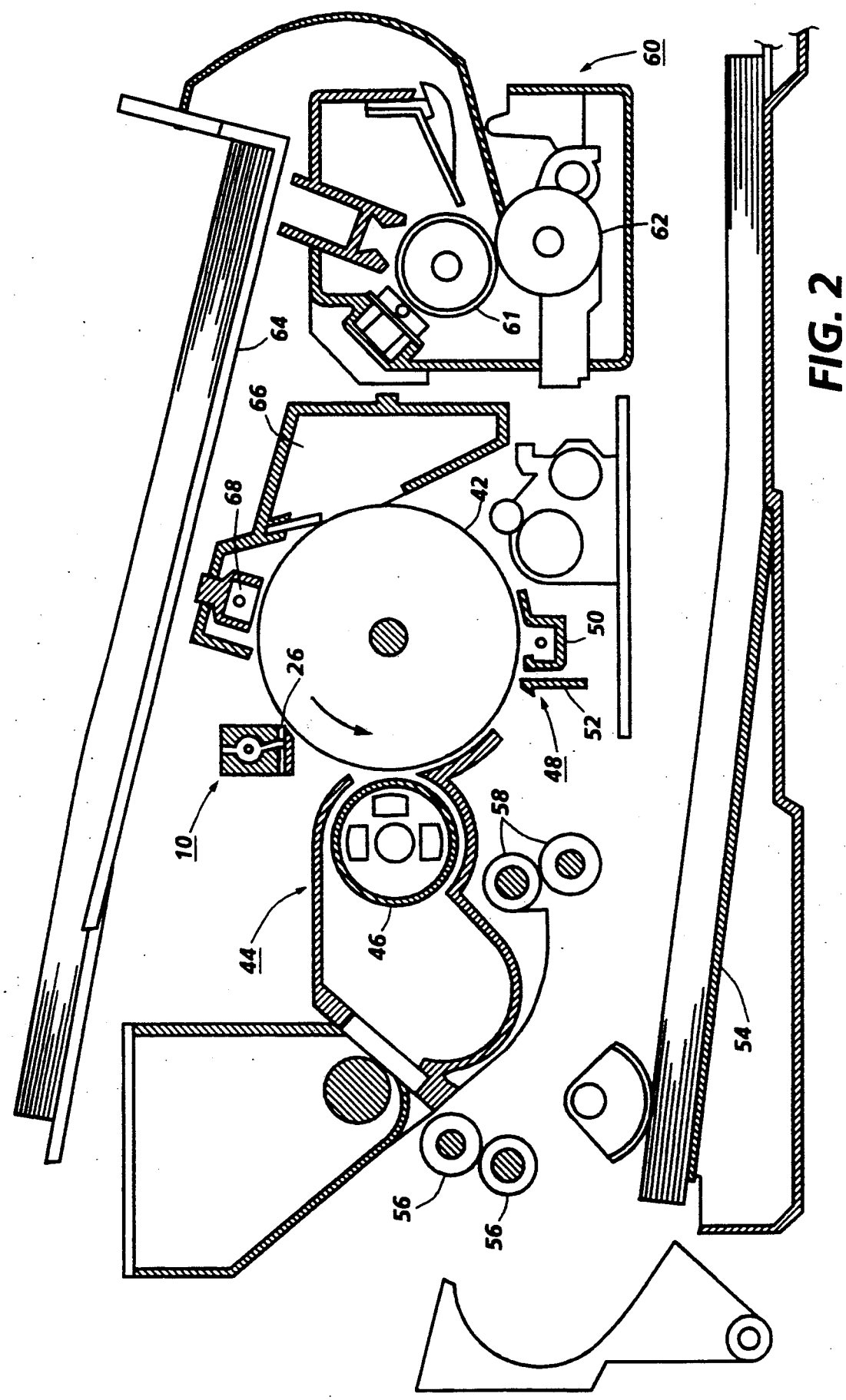
FIG. 2 is an elevational view depicting an electrographic printing machine incorporating the present invention.

With reference to FIG. 2, there is disclosed in general a printing apparatus in accordance with the present invention. Initially, the receiver 42, a substrate supporting any suitable electrostatic material is charged to a background voltage, in a preferred embodiment, approximately −1500 volts. The receiver 42 is rotated in a direction of the arrow past the outlet channel 26 of the fluid jet assisted ion projection apparatus. The charge pattern corresponding to the image to be reproduced is projected onto the surface of the receiver 42 providing a latent image. Upon further rotation of the receiver to a developer station (generally shown at 44), suitable developer rolls 46 such as magnetic development rolls advance a developer material into contact with the electrostatic latent image. The latent image attracts toner particles from the carrier granules of the developer material to form a toner powder image upon the surface of the receiver.

The receiver 42 then advances to a transfer station shown generally at 48 where a copy sheet is moved into contact with the powder image. The transfer station 48 includes a transfer corotron 50 for spraying ions onto the backside of the copy sheet and also includes a pretransfer baffle generally shown at 52. Copy sheets are fed from selected trays, for example, tray 54 and conveyed through a suitable copy sheet paper path, driven by suitable rolls such as rolls 56 and 58 to transfer station 48.

After transfer, the copy sheet is driven to fuser station 60 including fusing rolls for permanently affixing the transferred powder image to the copy sheet. Preferably, the fuser assembly includes a heated fuser roll 61 and backup or pressure roll 62 with the sheet passing therebetween. After fusing, the copy sheet is transported to a suitable output tray such as illustrated at 64. In addition, a suitable cleaner 66, for example, a blade cleaner in contact with the receiver surface removes residual particles from the surface. Finally, an erase scorotron 68 neutralizes the charge on the receiver and recharges the receiver to the background voltage.

Figure 3:
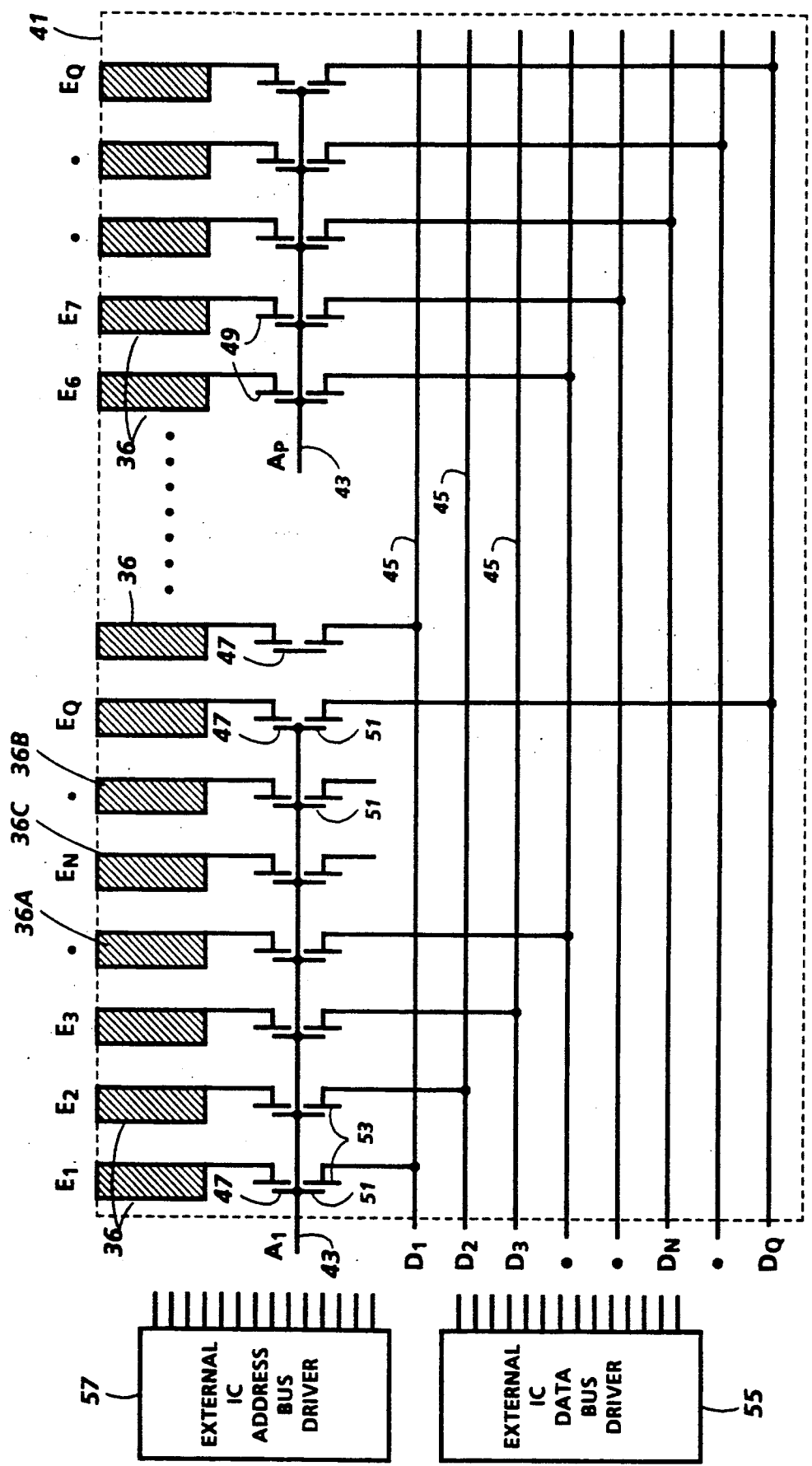
FIG. 3 is a schematic representation of the marking head of the present invention showing the modulation electrodes, the switching elements and the multiplexed driver circuitry.

Marking head 32 of FIG. 1, comprises the elements schematically illustrated in FIG. 3 supported upon a planar substrate 41 (represented by the dotted outline). These elements include an array of modulation electrodes (E) 36 and a multiplexed data entry or loading circuit, comprising a small number of address bus lines (A) 43 and data bus lines (D) 45. Each of the modulation electrodes in the array is individually switchable while simultaneously reducing the number of wire bonds required to interface the electrodes with the external driver circuits. Thin film switches 47 are fabricated directly on the marking head between the electrodes 36 and the data bus lines 45 and connected serially by small traces so that no wire bonds are required.

For simplicity of fabrication over the large area, full page-width head, the switches 47 are preferably amorphous silicon thin film transistors (a-Si:H TFTs), although other materials such as polycrystalline Si, laser annealed Si, CdS, Te, or ZnO may be used. As shown, each modulation electrode 36 is connected to the drain electrode 49 of the thin film transistor, an address bus line 43 (connected to a strobe voltage) is connected to the gate electrode 51 and a data bus line 45 is connected to source electrode 53. Since the number of address bus lines and data bus lines is reduced to a very small number through a multiplexing scheme, the number of wire bonds required is kept to a minimum. Wire bonding will be necessary between external IC address bus drivers 57 and the address bus lines 43, and between the external IC data bus drivers 55 and the data bus lines 45.

A low cost marking head incorporates modulation electrodes, thin film switching device, address and data buses, all integrally fabricated upon a single, inexpensive substrate as shown. It includes a-Si:H TFT switches which, ordinarily, would be discarded out of hand, as switching devices for a high speed printer because of their relatively small current capability and resulting relatively slow response time. However, when used in the fluid jet assisted ion projection electrographic marking apparatus, it has been shown that they are uniquely compatible. This is because (a) the fluid jet assisted ion printing process is controlled by modulation electrodes which do not need to draw current during "writing" and hold their charges for the entire line time, and (b) because the a-Si:H TFT switches do not allow the charge to be drained away during their OFF state, and their charging time is shorter than the system loading time.

Generally, horizontal 1 bit wide black lines print out with little difficulty. However, in transitioning from an all white region to a region containing a series of vertical, 1 bit wide black lines, the black lines will be initially washed out or thin, then will progressively get darker or wider until reaching a constant width. As illustrated in FIG. 3, each of the pixel or array modulation electrodes 36 receives an electrode voltage from transistor switch 47 that is a function of the strobe voltage at gate electrode 51 and the data voltage applied to source electrode 53 for that particular modulation electrode. It has been discovered that the vertical black line problem has been caused by the voltage leakage or crosstalk between adjacent modulation electrodes 36 on the electrode array.

Assume that a white pixel is caused when the voltage of modulating electrode 36 is relatively high and that a black pixel is written when the modulating electrode voltage is relatively low. The problem is that neighboring white pixel electrodes 36A, B overcharge and over modulate, thereby causing the formation of a field within the adjacent black pixel channel, having modulation electrode 36C. This also increases the leakage and increases the voltage on 0 voltage (black) pixel electrodes. As disclosed in U.S. Pat. No. 4,794,412 to Casey et al. this phenomenon can be avoided by lowering the data voltage below the strobe voltage, thereby reducing the magnitude of the interactive fields. The amount of voltage offset between the strobe voltage the higher data voltage varies from array to array. Moreover, as electrode voltage is reduced the array moves closer and closer to operation at a marginal ion modulation point, also referred to as the background threshold. More specifically, system latitudes may prevent the reduction of the electrode voltage to a point which would assure the ability to eliminate crosstalk field effects while remaining above the background threshold.

In order to further eliminate the effects of crosstalk and to assure the faithful output of thin vertical lines, the pixel stretching apparatus of the present invention is used to modify the image data used to produce the latent image. Furthermore, the apparatus may be selectively controlled by a user to produce various levels of enhancement for all detailed or faint features within an input image.

Figure 4A:
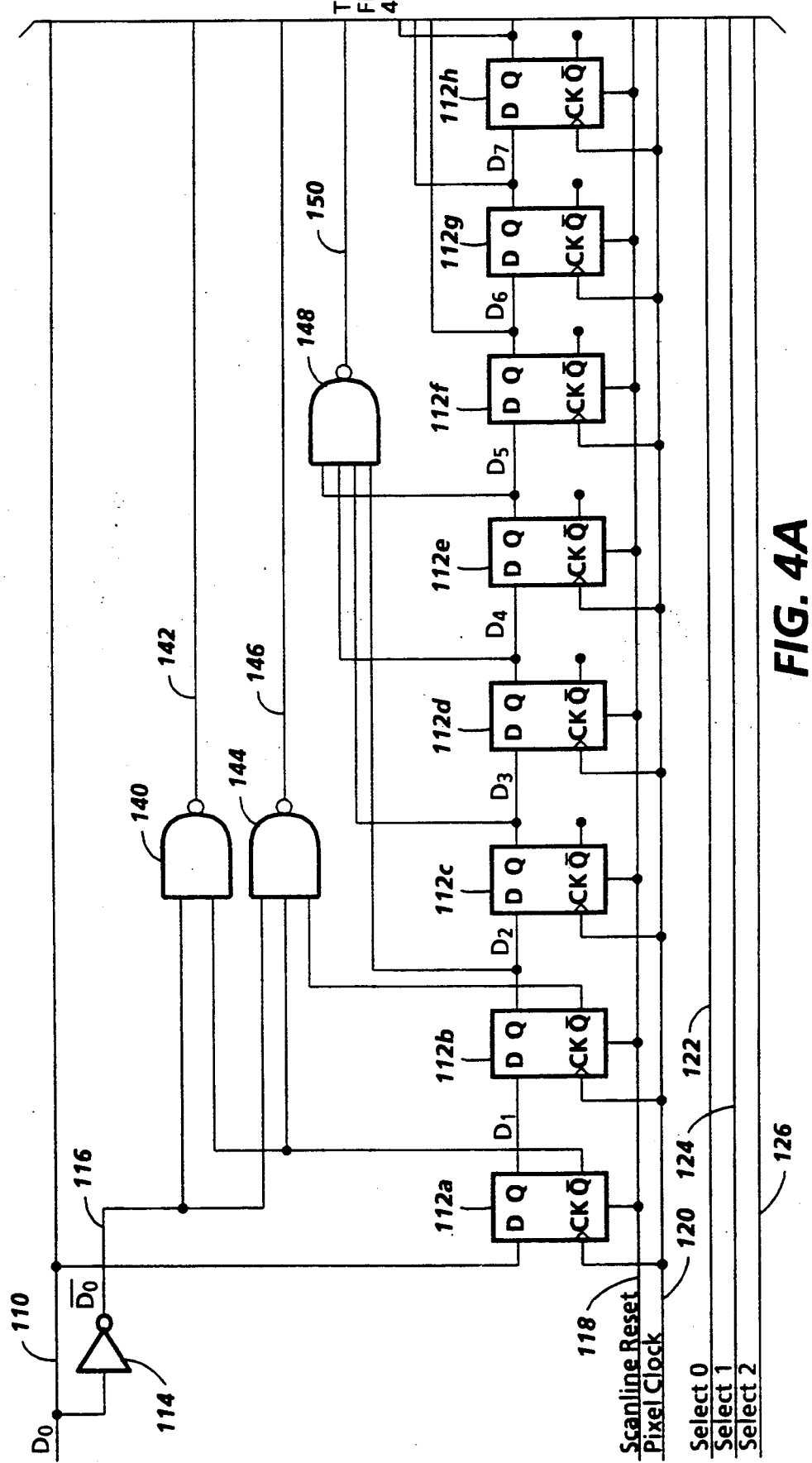
FIGS. 4a and 4b are a schematic representation of the stretching circuit of the present invention.
Figure 4B:
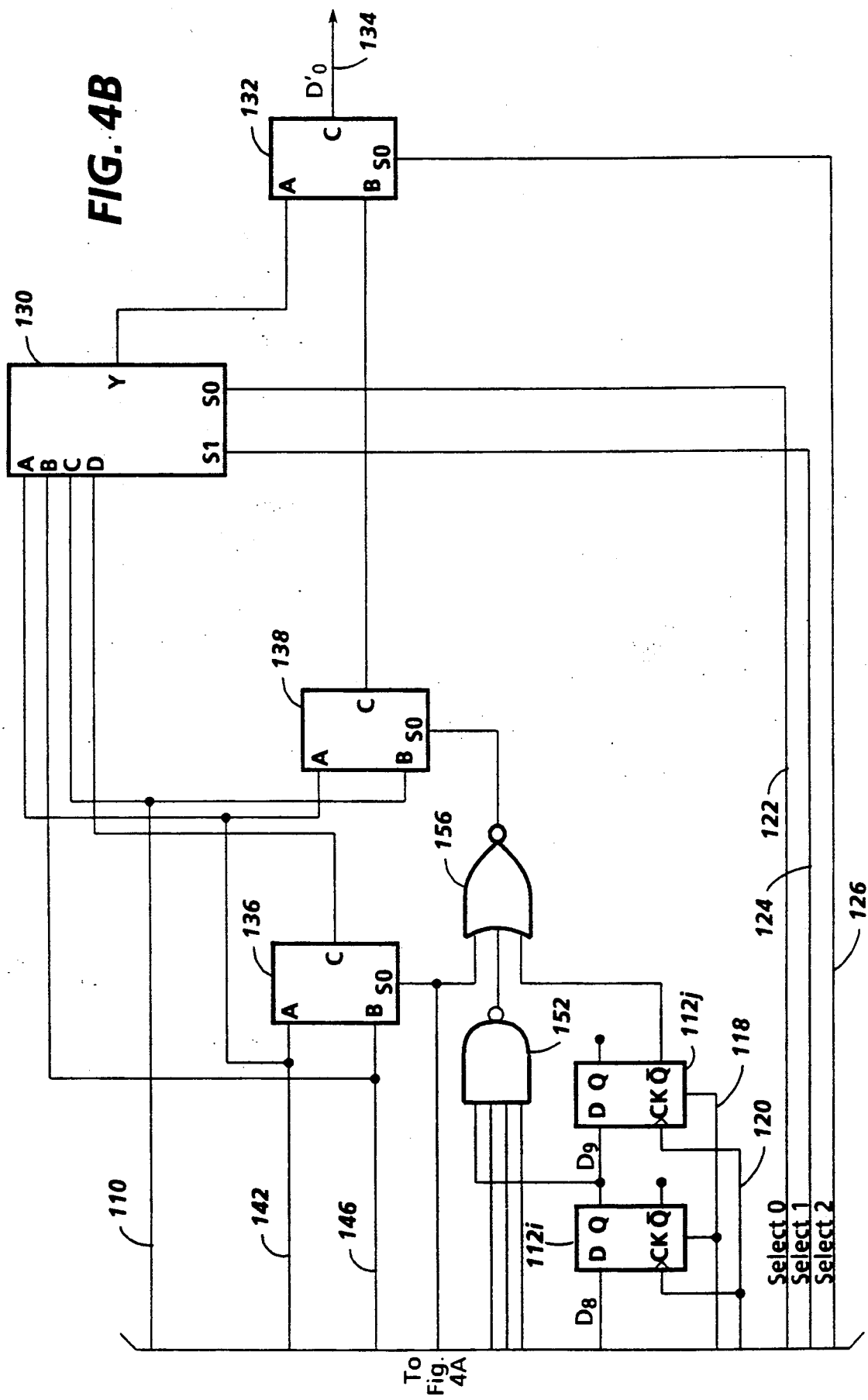

Referring to FIGS. 4a and 4b, which schematically illustrate the relevant portions of an application specific integrated circuit (ASIC) used to implement the present invention, incoming binary pixel $D_0$ represents one bit or pixel of a serial bit stream of input image data to be modified and output to data bus driver 55 of FIG. 3. Latches 112a through 112j are connected in a serial fashion, output to input, to form a shift register suitable for the storage of up to ten consecutive input image pixel values, $D_1$ through $D_{10}$. Input signal $D_0$, on line 110, is also passed through inverter 114 to generate signal $\overline{D_0}$ on line 116. Other inputs to the pixel stretching hardware include a Scanline Reset signal on line 118, which resets latches 112 at the beginning of each output raster and a Pixel Clock signal, line 120, to provide a clocking edge to all the latches, causing them to latch their respective inputs. In addition, select lines 122, 124 and 126 carry signals that represent the currently selected pixel stretching mode, according to Table 1:

TABLE 1

| Mode | Select 2 | 1 | 0 | Description |
|---|---|---|---|---|
| 0 | 0 | 0 | 0 | Stretch all black strings by 1 pixel |
| 1 | 0 | 0 | 1 | Stretch all black strings by 2 pixels |
| 2 | 0 | 1 | 0 | No stretching |
| 3 | 0 | 1 | 1 | Stretch strings 1 to 3 pixels wide by 2 pixels, Stretch strings 4 or more pixels wide by 1 pixel |
| 4 | 1 | 0 | 0 | Stretch strings 1 to 9 pixels wide by 1 pixel |

More specifically, select lines 122 and 124 control the input selection of 4:1 multiplexer (MUX) 130, while line 126 controls the input selection of the final 2:1 multiplexer, MUX 132, whose output is supplied to the marking head of FIG. 3.

Determination of the output pixel state $D_0'$, line 134, is accomplished by a series of combinational logic steps. Initially, signal $\overline{D_0}$ and signal $D_1$, from the inverted output of latch 112a, are combined at NAND gate 140 to produce the signal $D_0+D_1$ on line 142. In a similar fashion, NAND gate 144 produces the signal $D_0+D_1+D_2$ on line 146. The outputs from gates 140 and 144 are applied as inputs to MUX 130 at the A and B inputs respectively. Effectively, signal $D_0+D_1$ on line 142 will be active, representing a black pixel, whenever either the current original pixel $D_0$, or the most recent original pixel $D_1$ is a black pixel. Thus, the signal on line 142 is output whenever the user has selected output mode 0. Similarly, the signal $D_0+D_1+D_2$ on line 146 will be active whenever any of the current or two most recent original pixels have been black pixels, thereby stretching any string of black pixels by two additional black pixels. Signal $D_0+D_1+D_2$ will be output for $D_0'$ on line 134 whenever output mode 1 is selected by the user.

When output mode 2 of Table 1 is selected, MUX 130 selects input C to be connected to output Y. Input C is a direct connection to the current incoming pixel $D_0$ whose signal is then passed to MUX 132 for output on line 134. The direct connection of the incoming pixel signal ($D_0$) to output signal $D_0'$, therefore, produces no stretching of black pixel strings as desired for mode 2.

Selection of mode 3 by the user will enable the $D_0'$ signal to be generated from input D of MUX 130. The signal at input D of MUX 130 is provide by output C of MUX 136. In turn, the A and B inputs to MUX 136 are the signals previously described on lines 142 and 146, respectively. The select input (S0) for MUX 1 is provided by NAND gate 148 on line 150. The signal on line 150, $\overline{D_2+D_3+D_4+D_5}$ will be active (1) when any of the previous pixels $D_2$ through $D_5$ are white pixels, thereby causing the selection of input B of MUX 136. Input A of MUX 136 is selected only when all four input image pixels $D_2$ through $D_5$ are black or active pixels. Effectively, MUX 136 implements the logic necessary to provide the output associated with output mode 3, stretching black pixel strings of one to three pixels in length by two additional black pixels and stretching strings greater than three pixels in length by one additional black pixel.

Finally, output mode 4 is enabled by an active (1) Select2 signal on line 126, which controls the selection of input B of MUX 132, provided from output C of MUX 138. Moreover, MUX 138 controls the selection of either the signal from line 142, which has been previously described as a signal suitable to stretch a string by one additional pixel, or the current pixel $D_0$ on line 110.

MUX 138 also has select input (S0), a combinational logic signal output from NOR gate 156. The three input signals to NOR gate 156 include the signal output from NAND gate 148 on line 150, a similar signal generated by NAND gate 152 ($\overline{D_6+D_7+D_8+D_9}$) and output on line 154, and the $D_{10}$ signal on line 158. NORing of the signals input to gate 156 results in an output signal which is active only when all ten previous input pixels, $D_1$ through $D_{10}$ are black pixels. Essentially, this results in the output of an additional black pixel at the end of a string of nine or fewer black pixels, as specified in Table 1.

Figure 5A:
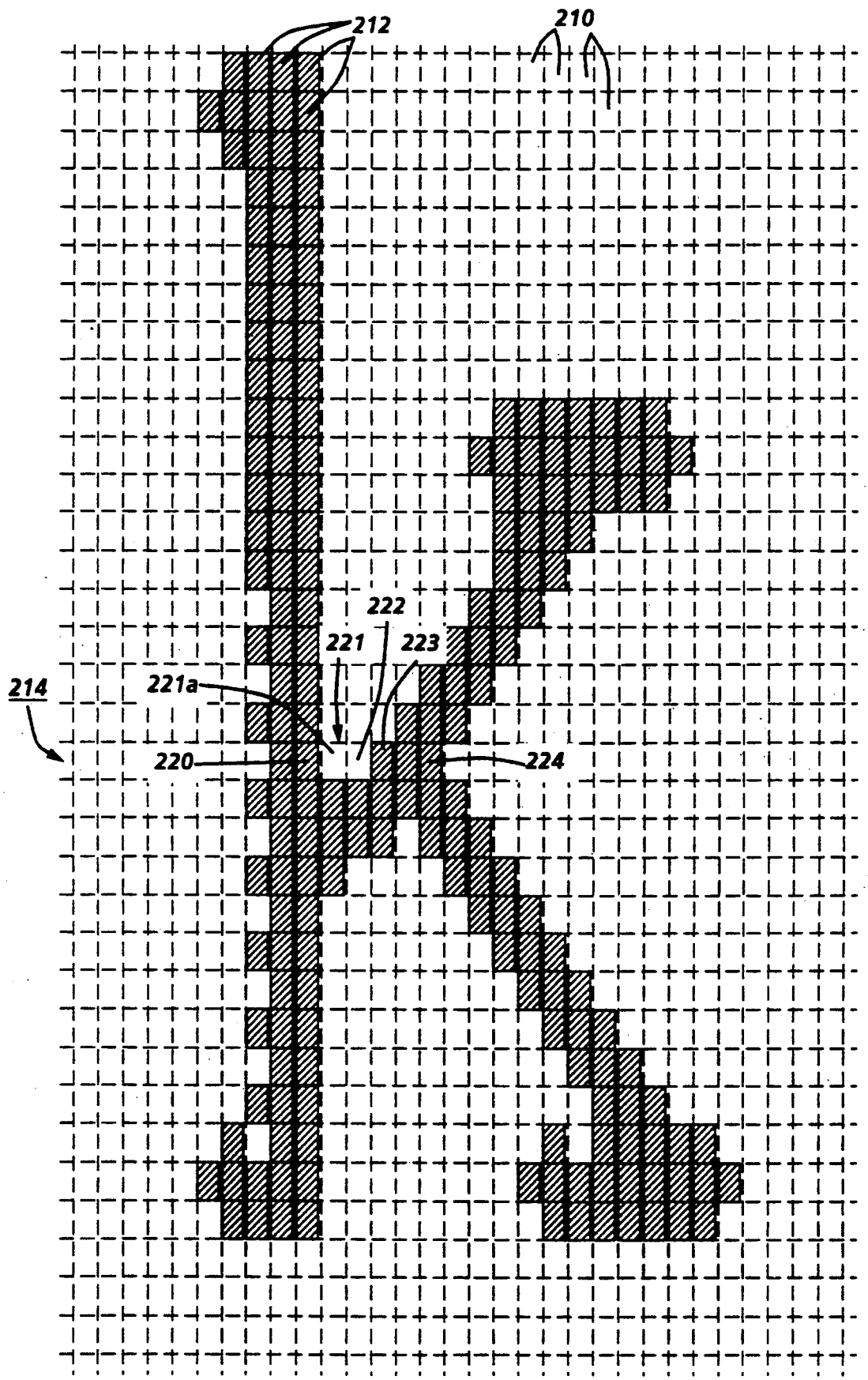
FIGS. 5a and 5b are magnified representations of ionographic output for normal and stretched modes, respectively.
Figure 5B:
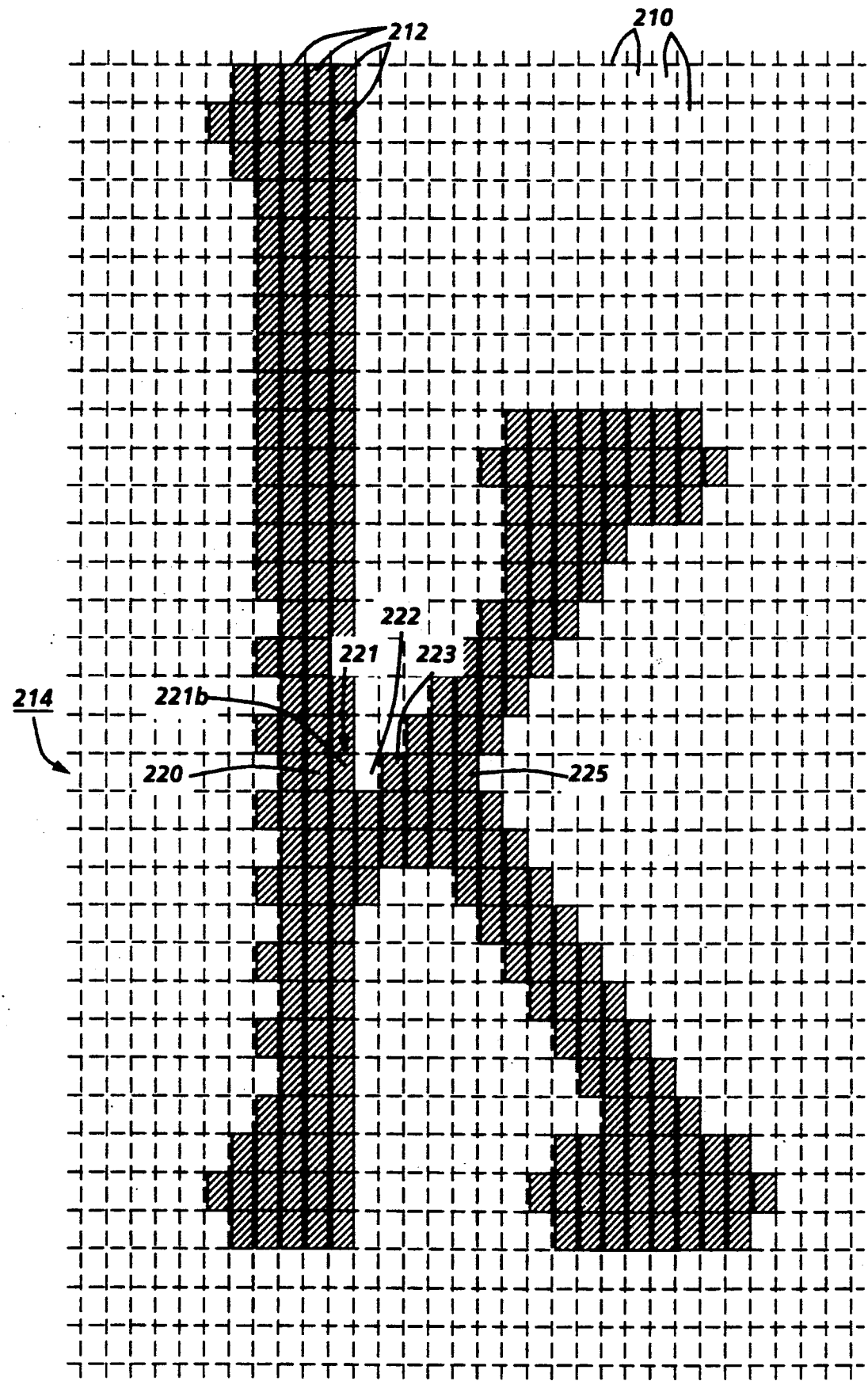

FIG. 5a illustrates the magnified output from a system employing no pixel stretching. FIG. 5b illustrates the magnified output from a system employing the stretching process associated with output mode 0 of Table 1, in accordance with the present invention. More specifically, FIGS. 5a and 5b contain a pattern of white pixels 210 and black pixels 212, which depict the ionographic output of character 'k' in magnified form. Referring now to both FIGS. 5a and 5b, when output raster 214 is viewed from left to right, the output pixels are equivalent through pixel location 220. At pixel location 221, the pixel stretching hardware has changed the white pixel, 221a, of the original image to a black pixel, 221b, thereby stretching the first string of black pixels found in raster 214 by one additional black pixel, 221b. Moving again to the right, pixel position 222 contains a white pixel in both figures and beginning at position 223 is a second string of black pixels. In the original image, depicted in FIG. 5a, the second string extends for a length of three black pixels, ending at pixel location 224. In the pixel stretched image of FIG. 5b, the second string extends for a length of four pixels, ending at pixel location 225, once again illustrating the effective stretching of the black pixel strings.

It is evident, from a comparison of the magnified output representations of FIGS. 5a and 5b, that the image depicted in FIG. 5b, having been processed in accordance with the present invention, exhibits a more robust representation of the character. Moreover, the present invention enables a user to selectively control the amount or mode of stretching that is to be applied to the image. It should be noted, however, that the present invention has been described simply in terms of an output raster and that it may be implemented on a pagewise basis, maintaining the same output mode selection over an entire output page or set of output pages. Furthermore, given the appropriate image window coordinates and image data control logic, the present invention would be extensible to allow the alteration of the selected output mode during the output of a raster line, so that different portions of an image may be processed with different output modes.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

We claim:

1. An ion projection device for providing a latent image, representative of binary input image data, on an image bearing member having means for receiving the binary image data from a source external to the ion projection device, an ion generator, an inlet channel and an outlet channel connected to the ion generator, a source of transport fluid in communication with the inlet channel for delivering transport fluid to move ions through the outlet channel, the outlet channel being located near the image bearing member, modulation means located adjacent the outlet channel for controlling the passage of ions therethrough to the image bearing member, the modulation means comprising a plurality of spaced, individually controllable modulation electrodes for neutralizing selected ions in the outlet channel and allowing selected ions to pass to the image bearing member representing a desired charge pattern, and a switch electrically connected to each of the modulation electrodes, each driver responding to a data voltage and a strobe voltage to selectively control the modulation electrode wherein the improvement comprises:

means for processing said binary image data to produce processed binary image signals including means for storing one or more immediately preceding binary image signals, means for selecting an output mode, so that all subsequent binary output image signals are processed in accordance with the output mode selection, and means for producing processed binary output image signals, as derived from said binary image data and one or more of said immediately preceding binary image signals, in response to said selected output mode, so that said processed binary image signals will result in generation of a latent image, having horizontally enhanced vertical image structures, on the image bearing member; and means for generating the data voltage in response to said processed binary image signals.

2. The ion projection device of claim 1 wherein the storing means comprises one or more binary latches connected in a serial fashion to produce a shift register having parallel outputs.

3. The ion projection device of claim 1 wherein the means for producing a processed binary output image signal further comprises:

means for analyzing said immediately proceeding binary image signals to determine the length of a string of active binary image signals; and means, responsive to said selected output mode, for modifying an inactive binary input image signal to produce an active binary output image signal, so that said modified signal extends the length of said string of active binary image signals being output.

4. An ionographic printing device having, memory for storing a plurality of binary pixel signals representative of the image to be printed, an ion generator, modulation means comprising a plurality of spaced, individually controllable modulation electrodes for controlling the flow of ions from the ion generator an a driver electrically connected to each of the modulation electrodes whereby each driver is responsive to a binary pixel signal wherein the improvement comprises:

means for selecting an output image enhancement mode;

means for reading the binary pixel signals from the memory in an imagewise fashion;

means for sequentially storing one or more of the previously read pixel signals;

means, responsive to said output image enhancement mode, for altering the output state of the most recently read binary pixel signal, so that said output state extends the length of a string of previously output pixels having the same state, thereby causing the enhancement of the image generated by the flow of ions from the modulated electrodes.

5. The ionographic printing device of claim 4, including means to selectively define the magnitude of the extension of the string.

6. In an ion projection device, the device including an image bearing member, an ion generator, an inlet channel and an outlet channel connected to the ion generator, a source of air in communication with the inlet channel to move ions through the outlet channel, the outlet channel being located near the image bearing member, modulation means located adjacent the outlet channel for controlling the passage of ions therethrough to the image bearing member, the modulation means comprising a plurality of spaced, individually controllable modulation electrodes for neutralizing selected ions in the outlet channel and allowing selected ions to pass to the image bearing member representing a desired charge pattern, and a driver electrically connected to each of the modulation electrodes each driver responding to an image pixel signal and a strobe signal to selectively control the modulation electrode, a method of enhancing the black portions of an output image generated from the latent image comprising the steps of:

analyzing the current pixel signal to determine if the current pixel is white or black;

determining the currently selected output mode;

analyzing the signals from a set of consecutively stored previous pixels, said set of previous pixels being defined by the currently selected output mode;

setting the current output pixel state to black if said set of previous pixels contains only black pixels, so that said set of black pixels is effectively extended by an additional black pixel;

shifting all the stored previous pixels to the next oldest pixel storage location;

storing the current pixel signal in the newest pixel storage position; and repeating the above steps for all pixels within an output raster.

7. A device for the adjustment of the digital data stream that drives the modulators in an ionographic device in order to compensate for modulator crosstalk comprising:

means for providing both white and black image pixels;

means for identifying portions of the data stream providing strings of black image pixels; and means to stretch the strings of black image pixels in order to provide wider vertical lines.

* * * * *